G. RENNERFELT.
FRICTION GEARING.
APPLICATION FILED MAY 11, 1911.
1,017,911.
Patented Feb. 20, 1912.
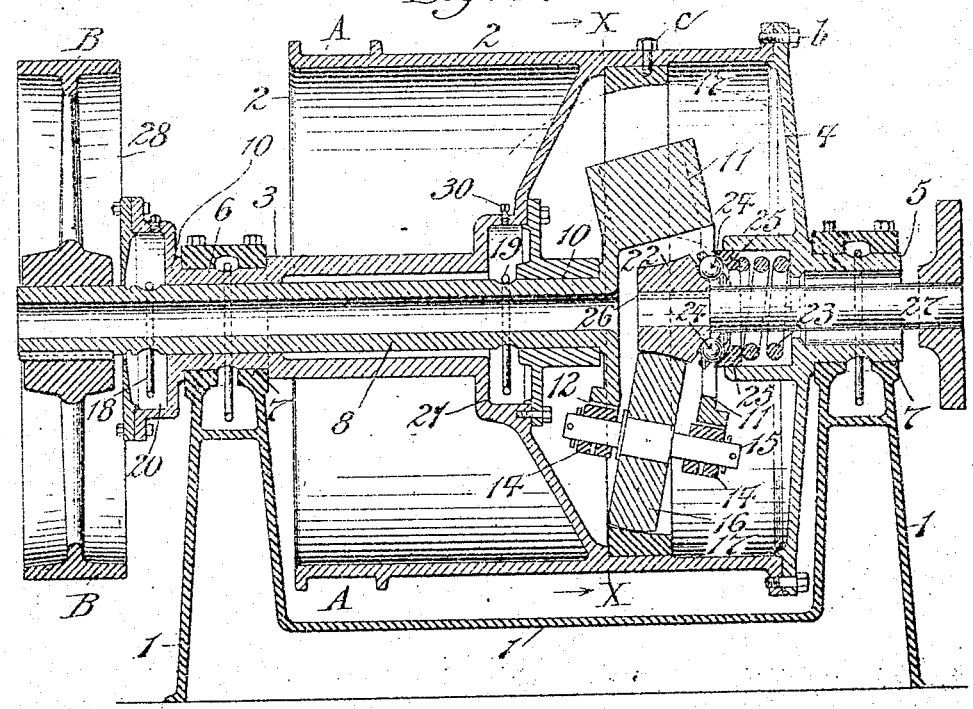
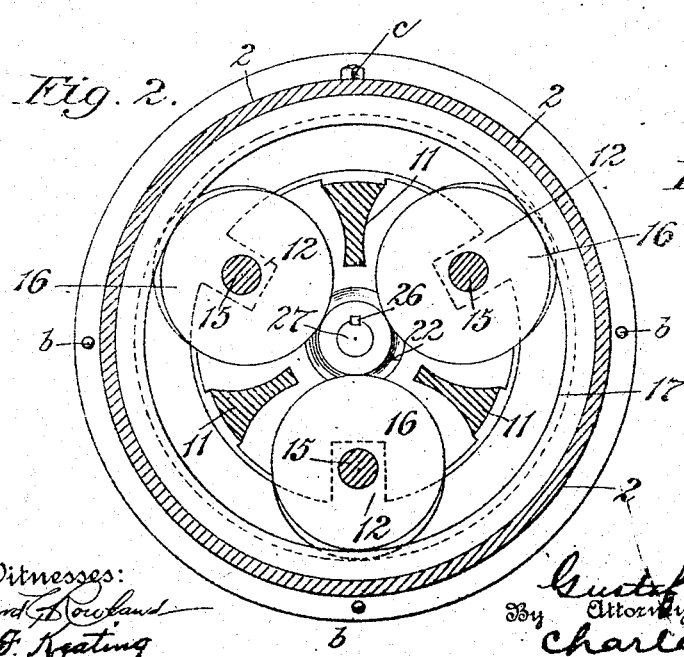
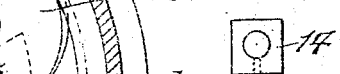
Witnesses:
Edward Rowland
M. F. Keating
Inventor
Gustaf Rennerfelt
By Attorney
Charles J. Kintner

UNITED STATES PATENT OFFICE.

GUSTAF RENNERFELT, OF NEW YORK, N. Y., ASSIGNOR OF ONE-HALF TO CHARLES J. KINTNER, OF NEW YORK, N. Y.

FRICTION-GEARING.

1,017,911.  Specification of Letters Patent.  Patented Feb. 20, 1912.

Application filed May 11, 1911. Serial No. 626,557.

*To all whom it may concern:*

Be it known that I, GUSTAF RENNERFELT, a subject of the King of Sweden, and resident of New York, borough of Brooklyn, county of Kings, and State of New York, have made a new and useful Invention in Friction-Gearing, of which the following is a specification.

My invention is directed particularly to improvements in that type of gearing known in the art as planet friction gearing, and it has for its objects, first, to increase the efficiency and reliability of gearing of this type and to so arrange the parts thereof that the rollers utilized in connection therewith shall not become subjected to abnormally high pressures. Second, to provide a system of planet gearing of this type which may be cheaply constructed and readily made applicable to various uses in the transmission of power.

My invention as illustrated in the accompanying drawings is made especially applicable in connection with hoists or elevators the drum of which is arranged to be rotated alternately in either direction, so that the shaft which delivers the power to the elevator may be rotated constantly in the same direction from any source of power with which it is connected.

For a full and clear understanding of my invention such as will enable others skilled in the art to construct and use the same, reference is had to the accompanying drawings, in which,—

Figure 1 is a longitudinal sectional view of the apparatus, one of the friction gearing rollers, however, being left out in this view to better illustrate the peculiar structural nature of the parts with which they are associated. Fig. 2 is a cross sectional view taken through Fig. 1 on the broken line X—X and as seen looking thereat from left to right in the direction of the arrows and upon the supposition that all the friction gearing rollers are in place, the journal bearing blocks for the rollers of the friction gearing being left out in this view. Fig. 3 is a detail side elevational view of one of the journal bearing blocks for the rollers.

Referring now to the drawings in detail, 1 represents the base plate or frame which is adapted to be secured in any preferred way to the floor or at the point where the apparatus is to be utilized, and 2 represents the elevator drum which serves as a casing adapted to inclose the operative parts of the gearing and to fully protect the same from dust, dirt, or grit.

3 illustrates a hollow shaft cast integral with the drum being connected thereto by a web, as shown, and 4 shows a drum head secured directly to the drum 2 by a plurality of bolts $b$, $b$.

5 and 6 represent journals seated in bearings 7, 7 in the base plate or frame 1, as shown, there being provided for such journals and bearings the usual oil reservoirs and oil rings, as shown. The journal 5 is cast integral with the head 4 as is also an internally projecting sleeve, the function of which latter will be described later on; while the journal 6 is cast integral with the hollow shaft 3.

8 represents a second shaft preferably hollow—but not necessarily so—said shaft being journaled in bearings 10, 10 at its opposite ends on the interior of the hollow shaft 3 and provided at its interior end with a yoke 11 which is connected integrally with the shaft 8 by a web formed in casting. This yoke is hollow, as shown, and is provided with three pairs of radially disposed slots 12, 12, 12 located 120° apart and adapted to slidingly support three pairs of bearing blocks 14, 14, 14 in which are journaled journal bearing studs 15, 15, 15 which support each a roller 16 having a spherical or convex rolling face, the journal bearing blocks 14, 14 being held in place by pins and washers at the opposite ends, as clearly shown.

17 illustrates a hard steel track formed with an internally disposed spherical face and secured directly to the drum by a screw bolt $c$.

The outer journal bearing for the shaft 8 is formed within the inner surface of the hollow shaft 3 and the inner journal bearing 10 therefor is provided with a lateral flange which is bolted directly to the inner face of the web which connects the shaft 3 with the drum 2.

18 and 19 illustrate oil rings which are held in place by their own weight in grooves about the outer face of the shaft 8 and are adapted to convey oil to the bearings of this shaft from oil reservoirs 20 and 21, the former being cast integral with the shaft 3 and provided with a ring cap secured thereto, as shown, the latter being formed between an enlargement at the inner end of the hollow shaft 3 and the flange which supports the journal bearing 10.

22 represents a friction pinion made preferably of hard steel and arranged to be pressed between and against the rollers 16 through the agency of a source of pressure as a strong spiral spring 23, balls 24 and a steel ball bearing race 25, the spring and ball bearing race being located within the sleeve above referred to as being cast integral with the head 4. The usual cage is also provided for separating the balls 24, as shown. The face of the pinion 22 is seated in contact with the rollers 16 and it is concave, being formed as a surface of rotation with a genetrix which is an arc of a circle having a radius somewhat greater than the radius of one of the rollers 16, 16. The face of the ball bearing race constitutes the part of a sphere having a radius centered in the center of the pinion 22, as shown by an enlarged dot, and the ball bearing face of the track 17 has preferably a radius which centers at the same point. These two relatively spherical features are indicated by dotted circles in both instances. The pinion 22 is connected to a driving shaft 27 through the agency of a spline 26. This shaft 27 is in turn provided with means, as shown, for connecting it to any source of driving power adapted to drive it continuously in one direction at relatively high speed.

A represents a brake surface upon the drum 2 adapted to be provided with a brake of usual type, and B represents a second similar brake surface on the outer face of a brake wheel or pulley 28 splined to the outer end of the shaft 8 and provided also with a brake, it being understood that in the case of an elevator the source of control of the brakes is carried by the car and adapted to be operated by the attendant in the usual way.

The mode of operation is as follows—the shaft 27 and the pinion 22 carried thereby are rotated continuously at a high speed and in a constant direction and the brake shoes are both relatively loose when the car is stationary and at the base of the elevator shaft. It will be understood that the curvilinear face of the pinion 22 is pressed continuously against the inner curvilinear faces of the rollers 16, through the agency of any preferred means, as a strong spiral spring 23, and with sufficient force to enable the source of power to impart the desired amount of energy to carry a maximum load with a certainty of preventing any slipping, even if the apparatus be subjected to considerable overload. By reason of the sufficiency of the frictional forces at the points of contact between the rollers 16 and the pinion 22 and between said rollers and the track 17, the rollers will tend to rotate the yoke 11 with its shaft 8 in the same direction as the shaft 27 is rotated by the source of power. They will also tend drum 2 and shaft 3 in a reverse direction. Whether the shaft 8 or the shaft 3 will be rotated depends upon which one of the brake shoes B is applied against its braking surface A or B, so that (to illustrate) if the brake shoe for the surface A be loose and the brake shoe for the surface B tightened the drum will be rotated by the power applied to the shaft 27 and, consequently, a car attached to a cable wound around the drum 2 will ascend.

If both the brake shoes are loose the shafts 3, 8 and 27 will all rotate in the same direction, thus permitting the car to descend by gravity with a speed which can be regulated by a more or less forceful application of the brake shoe upon the surface A. If the brake shoe upon the surface A be tightened the drum is held still and the shaft 8 is rotated. The ratio between the speeds of the shaft 27 and the shafts 3 or 8 depends upon the relative size of the diameter of the track 17 and the diameter of the pinion 22, said sizes being determined also with regard to the amount of power to be transmitted by the gearing. The rollers 16 are made spherical on their bearing surfaces in order that they shall not be subjected to axial force or to a force tending to tilt them. The track 17 is made spherical in order that the rollers 16 shall be sure to travel on said track in a circle. The race 25 is made spherical in order to provide a self-adjustment of such race in relation to the pinion 22. The depth of the slots 12 should be great enough to allow some clearance under the bearing blocks 14, but not sufficiently great to allow any considerable variation in the position of the rollers 16 from the position shown in the drawings. For the several bearing blocks and such other parts of the device as require oil, holes such as 30 are provided therewith for eliminating friction and wear. Obviously other means of pressure might take the place of the spring 23 and said means of pressure might be made adjustable to adapt it for varying loads, as disclosed in a pending application filed by me in the U. S. Patent Office on the 4th day of August, 1909 and bearing Serial No. 511,099.

I make no claim in the present application to a roller with a spherical rolling face in planet friction gearing, this feature having been previously claimed by me in the above-named application Serial No. 511,099.

I do not limit my invention to the specific details of construction disclosed in the accompanying drawings as a number of the features thereof might be departed from and still come within the scope of my invention.

Nor do I limit my invention in its application to use in connection with lifts or elevators, as the essential novelty thereof consists in the provision of planet gearing so interconnected and arranged as to adapt it for use in the transmission of power generally in the arts where it is important that such power shall be transmitted in reverse directions from a rotary shaft driven continuously in one direction from a source of energy and at different speeds, and my claims hereinafter are designed to be of such scope as to cover broadly the application of these generic principles. Nor do I limit myself to the use of a reversible drum, as obviously a stationary casing may be utilized instead of the drum 2, in which event I could use the apparatus as a means for reducing the speed of an electric motor or any motive device capable of running at top speeds. Or, such a device might be used for increasing the speed of a driven mechanism by applying the power to the shaft 8 instead of the shaft 27 as before described, as will be obvious on inspection of the drawings.

Having thus described my invention what I claim and desire to secure by Letters Patent of the United States is—

1. Friction gearing embracing a driving shaft, a pinion thereon, a spherical track, a plurality of rollers having convex rolling surfaces and located between the pinion and the track, means for forcing the pinion against the rollers; together with a second shaft operatively connected with the rollers, substantially as described.

2. Friction gearing embracing a driving shaft, a pinion thereon, a spherical track, a plurality of rollers having convex rolling faces and located between the pinion and the track, means for forcing the pinion against the rollers, a second shaft operatively connected with the rollers; together with a drum operatively connected to the track and all operating substantially as described.

3. Friction gearing embracing a driving shaft, a pinion thereon, a spherical track, a plurality of rollers having convex rolling faces and located between the pinion and the track, means for forcing the pinion against the rollers, a second shaft operatively connected with the rollers; together with a drum operatively connected to the track and a brake for the drum, substantially as described.

4. Friction gearing embracing a driving shaft, a pinion thereon, a spherical track, a plurality of rollers having convex rolling faces and located between the pinion and the track, means for forcing the pinion against the rollers, a second shaft operatively connected with the rollers; together with a drum operatively connected to the track, and two brakes, one for the drum and the other for the second shaft, and all operating substantially as described.

5. Planetary friction gearing embracing a plurality of rollers having spherical faces, a concave friction pinion, carried by a driving shaft, and a spherical track, said rollers having frictional bearing between the pinion and the track; together with means for frictionally forcing the pinion against the faces of the rollers, substantially as described.

6. Planetary friction gearing embracing a plurality of rollers having spherical faces, a driving shaft, a friction pinion carried thereby and having a concave face in frictional relation with the aforesaid rollers, a spherical track, and a second shaft operatively connected with means for supporting the rollers; together with means for yieldingly forcing the pinion in firm frictional relation with the rollers, substantially as described.

7. Friction gearing embracing a driving shaft, a friction pinion carried thereby, a track, a plurality of spherical rollers having frictional relation between the track and the pinion; a second shaft and a yoke operatively connected therewith, said second shaft being provided with means for supporting the rollers around the pinion; together with means for yieldingly holding the pinion in frictional relation with the rollers, substantially as described.

8. Friction gearing embracing two shafts, a friction driving pinion carried by one of said shafts, and a plurality of rollers carried by the second shaft; in combination with a spherical track rigidly secured around the rollers so that the latter have frictional contact between the track and the pinion; together with means for forcing the frictional pinion constantly against the faces of the rollers, substantially as described.

9. Friction gearing embracing a driving shaft, a friction pinion carried thereby and having a concave driving face, a second shaft, and a plurality of rollers carried thereby, said rollers having convex faces and frictionally bearing against the face of the pinion; in combination with a track having a spherical driving face against which the rollers bear frictionally; means for supporting the track, and means for yieldingly forcing the pinion frictionally against the faces of the rollers, substantially as described.

10. A power transmitting apparatus embracing two rotatable shafts, a driving drum, and planetary friction gearing consisting of a pinion carried by one of said shafts, and a plurality of rollers carried by the other; together with a track carried within the drum and having frictional bearing against the outer faces of the rollers, substantially as described.

11. A power transmitting apparatus embracing two rotatable shafts, a driving drum, and planetary friction gearing consisting of a pinion carried by one of said shafts, and a plurality of rollers carried by the other; together with a track carried within the drum and having frictional bearing against the outer faces of the rollers, and means for yieldingly holding the pinion frictionally against the inner surfaces of the rollers, substantially as described.

12. A power transmitting apparatus embracing two rotatable shafts, a driving drum, and a planetary friction gearing having a driving pinion secured to one of said shafts and a plurality of rollers carried by the other and having frictional relation with the pinion; a track secured to the drum and having frictional relation with the outer surface of the rollers; together with a brake operatively connected with the drum and a second brake operatively connected with the second shaft, substantially as described.

13. A power transmitting apparatus embracing two rotatable shafts, a pulley carried by one of said shafts and means carried by the other for connecting it to a source of power; a plurality or rollers carried by the first shaft; a concave driving pinion carried by the second shaft; a track for the rollers, and an inclosing casing which supports the track; together with yielding means for holding the pinion in frictional relation with the rollers, substantially as described.

14. A power transmitting apparatus embracing two rotatable shafts, a friction pinion carried by one of said shafts, a plurality of rollers carried by the other shaft, a surrounding track for the rollers, and a means of support therefor, said pinion and track having concave running surfaces and the rollers convex running surfaces; together with means for yieldingly holding the surface of the pinion frictionally against the inner adjacent surfaces of the rollers, substantially as described.

15. The combination of a frame, a drum mounted with hollow journals in the frame, an oil reservoir fastened to the drum, a shaft extending through one of the journals, an oil ring upon the shaft within the oil reservoir, a planetary friction gearing within the drum operatively connected to the shaft and to the drum, and a second shaft extending through the other journal and operatively connected to the gearing.

16. Planetary friction gearing embracing a friction pinion having a concave driving surface, a track also having a concave driving surface, a plurality of rollers adapted to travel between said surfaces, means for rigidly supporting the track; together with yieldingly supported balls for holding the concave surface of the pinion in definite frictional relation with the adjacent convex surfaces of the rollers, substantially as described.

17. In a power transmitting apparatus a driving shaft, a second or driven shaft and planetary friction gearing operatively connecting the two shafts together; in combination with a third shaft, and a driving drum carried thereby, said drum being operatively connected with the friction gearing; together with two oiling reservoirs, one being rotatable with the drum and the other constituting a part of the frame of the machine, and oiling rings located in said reservoirs and adapted to oil the journal bearings between the concentrically driven shafting, substantially as described.

18. Friction gearing embracing a driving shaft, a concave pinion thereon, a track, a plurality of rollers having convex rolling surfaces and located between the pinion and the track, means for forcing the pinion against the rollers; together with a second shaft operatively connected with the rollers, substantially as described.

19. Friction gearing embracing a driving shaft, a pinion—having a concave rolling face—thereon, a track, a plurality of rollers having convex rolling surfaces and located between the pinion and the track, means for forcing the pinion against the rollers, a yoke having a plurality of radially disposed slots, bearing blocks loosely mounted in said slots, a stud through the center of each roller journaled in such blocks, and a second shaft operatively connected to the yoke, substantially as described.

In testimony whereof I have signed my name to this specification in the presence of two subscribing witnesses.

GUSTAF RENNERFELT.

Witnesses:
C. J. KINTNER,
M. F. KEATING.